United States Patent Office 3,804,834
Patented Apr. 16, 1974

3,804,834
1-(2',3',4'-TRISUBSTITUTED-PHENYL)-2-AMINO-ALKANOLS-(1) AND SALTS THEREOF
Anton Mentrup, Kurt Schromm, Otto Thomä, and Karl Zeile, Ingelheim am Rhein, Germany, assignors to Boehringer Ingelheim GmbH, Ingelheim am Rhein, Germany
No Drawing. Continuation-in-part of application Ser. No. 713,265, Oct. 16, 1967, now Patent No. 3,657,244, dated Apr. 18, 1972. This application Jan. 12, 1972, Ser. No. 217,292
Int. Cl. C07c 91/22
U.S. Cl. 260—254           2 Claims

ABSTRACT OF THE DISCLOSURE

The compounds are 1-(2',3',4'-trisubstituted-phenyl)-2-amino-alkanols-(1) and acid addition salts thereof, useful as sympathomimetics in warm-blooded animals.

---

This is a continuation-in-part of copending application Ser. No. 713,265, filed Oct. 16, 1967, now U.S. Pat. 3,657,244, issued Apr. 18, 1972.

This invention relates to novel 1-(2',3',4'-trisubstituted-phenyl)-2-secondary amino-alkanols-(1) and acid addition salts thereof, as well as to various methods of preparing these compounds.

More particularly, the present invention relates to racemic mixtures of a novel class of compounds of the formula

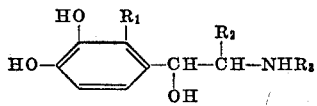

(I)

wherein $R_1$ is straight or branched alkoxy of 1 to 5 carbon atoms,
$R_2$ is hydrogen or lower alkyl, and
$R_3$ is straight or branched alkyl of 4 to 8 carbon atoms, cycloalkyl of 3 to 7 carbon atoms, or

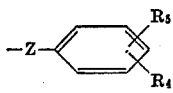

(Ia)

where
Z is straight or branched alkylene of 2 to 6 carbon atoms,
$R_4$ is hydrogen or methyl, and
$R_5$ is hydroxyl or methoxy;

their stereoisomeric components; their diastereomeric antipodes; and non-toxic, pharmacologically acceptable acid addition salts of said racemic mixtures, stereoisomers or diastereomeric antipodes.

The compounds according to the present invention may be prepared by a number of different methods involving well-known chemical principles, among which the following have proved to be particularly convenient and efficient.

METHOD A

By reducing a ketone of the formula

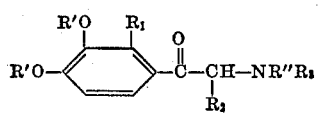

(II)

wherein $R_1$, $R_2$ and $R_3$ have the same meanings as in Formula I; each R' either is a hydrogen atom or is a protective group which if necessary is subsequently split off, preferably by hydrolysis or hydrogenation, such as acyl or benzyl; or both R', together with each other and the oxygen atoms to which they are attached, form an acetal group whose hydrocarbon moiety preferably contains the diphenylmethylene or cyclohexylidene group; and R" is hydrogen or a protective group, such as benzyl.

The reduction may be carried out with the aid of hydrogen in the presence of a hydrogenation catalyst; such as Raney nickel, platinum or palladium; or also with the aid of complex hydrides, especially sodium borohydride or lithium aluminum hydride; or also by means of the Meerwein-Ponndorf-Verley reduction.

The various protective groups may be split off all at once or in stepwise fashion, during or after the reduction, by conventional methods.

A starting compound of the Formula II may be obtained by customary methods, such as by reacting a compound of the formula

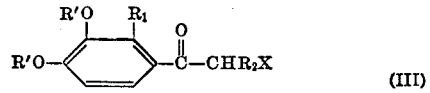

(III)

wherein $R_1$ and $R_2$ have the same meanings as in Formula I, R' has the same meaning as in Formula II, and X is chlorine, bromine or iodine, with an amine of the formula $$HNR''R_3 \qquad (IV)$$

wherein $R_3$ has the same meaning as in Formula I and R" has the same meaning as in Formula II.

METHOD B

By reducing a compound of the formula

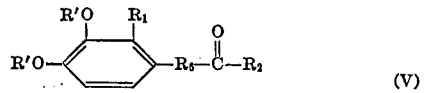

(V)

wherein $R_2$ and $R_1$ have the same meanings as in Formula I, R' has the same meanings as in Formula II and $R_6$ is —CO— or —CH(OH)—, in the presence of an amine of the formula $$H_2NR_3 \qquad (VI)$$

The reduction may be effected with hydrogen in the presence of a hydrogenation catalyst, such as Raney nickel or palladium, or with a complex hydride, such as lithium aluminium hydride or sodium borohydride. If the reduction is carried out with the aid of a complex hydride, it is preferred if each R' in the starting compound of the Formula V is a protective group, especially benzyl, and these protective groups may be removed in customary fashion subsequent to the reduction reaction. If desired, in those cases where $R_6$ is —CH(OH)—, the Schiff's base formed by the condensation reaction between Compound V and amine VI may also be used as the starting compound.

A dicarbonyl compound of the Formula V may be obtained by customary methods, such as by oxidation of an analogously substituted aceto-, propio-, butyro- or valerophenone with selenium oxide.

METHOD C

By reacting a compound of the formula

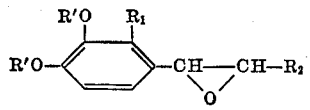

(VIIa)

or

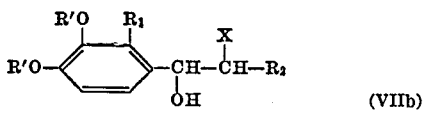

wherein $R_1$ and $R_2$ have the same meanings as in Formula I, R' has the same meanings as in Formula II, and X is chlorine, bromine or iodine, or a mixture of Compounds VIIa and VIIb, with an amine of the Formula IV. If R' and R'' in the reaction product thus obtained are protective groups, these may subsequently be removed in conventional fashion.

A compound of the Formula VIIa or VIIb may be obtained by known methods, for instance by reducing a halo-ketone of the formula

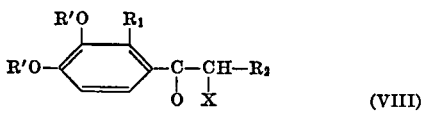

wherein $R_1$, $R_2$, R' and X have the meanings defined above, with sodium borohydride.

METHOD D

By reacting an amine of the formula

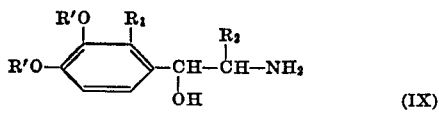

wherein $R_1$, $R_2$ and R' have the same meanings as in Formula VIIa, under reducing conditions, with a compound of the formula

wherein $R_7$ is hydrogen or straight-chain lower alkyl; $R_8$ is straight or branched lower alkyl, the sum of the carbon atoms in $R_7$ and $R_8$ being no greater than 7; and $R_8$ may further be

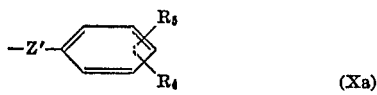

wherein Z' is lower alkylene, the sum of the carbon atoms in Z' and $R_7$ being no more than 5, and $R_4$ and $R_5$ have the same meanings as in Formula Ia; and $R_7$ and $R_8$, together with each other, may also be alkylene of no more than 6 carbon atoms.

The reducing agent may be hydrogen in the presence of a hydrogenation catalyst, such as platinum. If R' in Formula IX is a protective group which may be split off by hydrogenation, these protective groups may simultaneously be split off. If R' is acyl, these are removed subsequent to the reduction in customary fashion.

A complex hydride, such as sodium borohydride or lithium aluminium hydride, may also be used as the reducing agent. Under those conditions, it is preferred to use as the starting material a compound of the Formula IX wherein R' is a protective group, especially benzyl or diphenylmethyl, and any protective groups present in the reaction product may subsequently be split off in customary fashion.

An amine of the Formula IX may be obtained by well-known methods from an analogously substituted isonitrosoketone, cyanhydrin, benzoylcyanide, hydrazine, hydrazide, azidophenone or diazophenone. However, it is not necessary to prepare and isolate the amine IX separately; instead, an analogously substituted starting compound mentioned in the preceding sentence may be subjected, as such, to the reductive substitution reaction, whereby the amine IX is formed in situ and undergoes reaction with Compound X.

METHOD E

For the preparation of a compound of the Formula I wherein $R_2$ is hydrogen, by reducing a compound of the formula

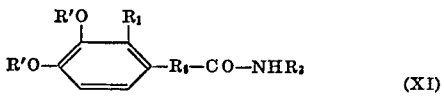

wherein $R_1$ and $R_3$ have the same meanings as in Formula I, R' has the same meanings as in Formula II, and $R_6$ has the same meanings as in Formula V, preferably with a complex hydride, such as lithium aluminum hydride. Especially suitable as a starting material is a carboxylic acid amide of the Formula XI wherein the hydroxyl groups in the 3- and 4-positions on the phenyl ring are protected in the form of acetal or benzylether groupings. These protective groups may be split off again subsequent to the reduction.

METHOD F

By reacting a compound of the formula

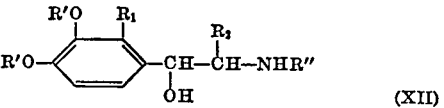

wherein $R_1$ and $R_2$ have the same meanings as in Formula I and R' and R'' have the same meanings as in Formula II, with a compound of the formula

wherein $R_3$ has the same meanings as in Formula I and Y is chlorine, bromine, iodine, arylsulfonyl or alkylsulfonyl. The reaction is advantageously carried out in the presence of an acid-binding condensation agent, such as sodium carbonate or potassium carbonate; however, the amine XII may itself also serve as the acid-binding agent, provided it is present in sufficient excess over and above the stoichiometrically required amount. The protective groups may subsequently be removed in customary fashion.

The compounds of the Formula I are organic bases and therefore form acid addition salts with inorganic or organic acids. Examples of non-toxic, pharmacologically acceptable acid addition salts are those formed with hydrochloric acid, hydrobromic acid, sulfuric acid, phosphoric acid, tartaric acid, fumaric acid, maleic acid, ascorbic acid, benzoic acid, cyclohexylsulfuric acid, 8-chlorotheophylline or the like.

In those instances where methods A through F yield initially an acid addition salt of a compound of the Formula I, this salt may be converted into the free base or into another acid addition salt by conventional methods, if desired.

If a starting compound for any of the methods described above exists in stereoisomeric forms, a pure stereoisomer thereof may be used as the starting compound.

If an end product of the Formula I contains only one asymmetric carbon atom, a racemic mixture thereof may, if desired, be separated into its optical antipode components by conventional methods. If more than one center of asymmetry are present, the racemates of the diastereomeric pairs of antipodes may be separated from each other, and each pair may in turn be separated into the individual antipodes. For the separation of the mirror-image-isomers it is preferred to use fractional crystallization of their addition salts formed with optically active acids, such as dibenzoyl- or ditoluyl-α-tartaric acid.

The following examples further illustrate the present invention and will enable others skilled in the art to understand it more completely. It should be understood, however, that the instant invention is not limited solely to the following particular examples.

EXAMPLE 1

Preparation of 1-(2'-methoxy-3',4'-dihydroxy-phenyl)-2-cyclopentylamino-ethanol(1) by method A 270 gm. of 2,3,4-trihydroxy-acetophenone [prepared according to Badhwar, Org. Synthesis, 14, 14 (1934)] were admixed with 772 cc. of acetone, 131 cc. of pyridine and 388 gm. of diphenyl-dichloro-methane, and the mixture was allowed to stand overnight. Thereafter, a solution of 200 gm. of sodium hydroxide in 500 cc. of water was added thereto in small portions, whereby the temperature of the reaction mixture rose to between 50 and 60° C. After about two hours of standing the reaction mixture was acidified with concentrated hydrochloride acid, the resulting stiff crystalline slurry was diluted with water, the crystals were separated by vacuum filtration and washed with water, the filter cake was suspended in methanol, the slurry was vacuum filtered, and the filter cake was washed with methanol, yielding 2-hydroxy-3,4-diphenyl-methylenedioxyacetophenone, M.P. 155–156° C.

249 gm. of 2 - hydroxy - 3,4 - diphenylmethylenedioxyacetophenone were admixed with 1250 cc. of methanol and 288 cc. of dimethylsulfate, the mixture was heated to 40° C., and then a solution of 204 gm. of potassium hydroxide in 813 cc. of methanol was slowly added while stirring, whereby the temperature of the reaction mixture rose to 53° C. The mixture was stirred for 45 minutes more, was then cooled to room temperature, the precipitate formed thereby was separated by vacuum filtration, and the filter cake was taken up in ether by stirring. The insoluble potassium bisulfate was separated by vacuum filtration, the filtrate was filtered through charcoal, and the ether was distilled off. The residue was poured on a plate, whereby 2 - methoxy - 3,4-diphenylmethylenedioxy-acetophenone crystallized out. 39 gm. of this compound were dissolved in 346 cc. of benzene, 10 cc. of bromine were added to the solution dropwise, and the bromination was allowed to proceed at 80° C. After the bromination had gone to completion the benzene was distilled off, the residue was crystallized from isopropanol, the crystalline product was collected by vacuum filtration, and the filter cake was washed with petroleum ether, yielding α-bromo - 2 - methoxy - 3,4-diphenylmethylenedioxy-acetophenone, M.P. 137° C.

63.8 gm. of this bromoketone were admixed with 52.5 gm. of N-benzyl-cyclopentylamine and 250 cc. of benzene, the mixture was refluxed for two hours, ether was then added to the reaction solution, and the precipitated N-benzyl-cyclopentylamine hydrobromide was separated by vacuum filtration. The filtrate was evaporated in vacuo, the residue was dissolved in methanol, the solution was neutralized with dilute hydrochloric acid, and an equal amount of water was added. The aqueous solution was then hydrogenated at 60° C. and 5 atmospheres until the theoretical amount of hydrogen had been absorbed, the catalyst was separated by vacuum filtration, and the filtrate was evaporated. The residue was dissolved in a mixture of equal parts of methanol and concentrated hydrochloric acid, and the solution was refluxed for two hours. Thereafter, the methanol was distilled off, the residue was allowed to cool, and the precipitate formed thereby was recrystallized from ethanol, yielding α-cyclopentylamino-2 - methoxy - 3,4-dihydroxy-acetophenone hydrochloride, M.P. 202–203° C.

6 gm. of the aminoketone thus obtained were dissolved in methanol, and the solution was hydrogenated at room temperature and atmospheric pressure in the presence of platinum as a catalyst until the theoretical amount of hydrogen had been absorbed. Thereafter, the catalyst was filtered off, the filtrate was evaporated, and the residue was heated with acetonitrile, whereby the initially oily product became crystalline. 1 - (2' - methoxy - 3',4'-dihydroxyphenyl)-2-cyclopentylamino-ethanol-(1) hydrochloride, M.P. 161–162° C., of the formula

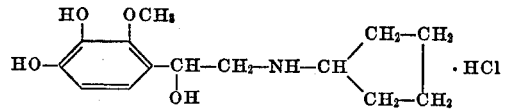

was obtained.

EXAMPLE 2

Preparation of 1-(2'-methoxy-3',4'-dihydroxy-phenyl)-2-(tert.butyl-amino)-ethanol-(1) by method A A mixture consisting of 85 gm. of α-bromo-2-methoxy-3,4-diphenylmethylenedioxy-acetophenone, 500 cc. of benzene and 32 gm. of tert.butylamine was refluxed for two hours. Thereafter, the benzene was distilled off in vacuo, the residue was taken up in ether, the insoluble tert.butylamine hydrobromide was separated by vacuum filtration, and the filtrate was evaporated in vacuo after having been washed with water. The residue was dissolved in ethyl acetate, and the solution was acidified with ethereal hydrochloric acid, yielding α-tert.butylamino-2-methoxy-3,4-diphenylmethylenedioxy-acetophenone hydrochloride, M.P. 182–183° C.

23 gm. of this amino-acetophenone compound were admixed with 95 cc. of concentrated hydrochloric acid and 135 cc. of methanol, and the mixture was boiled for two hours. Thereafter, the methanol was distilled off in vacuo, benzene was added to the residue, and the mixture of benzene and water was distilled off. The residue was stirred with hot methyl ethyl ketone and ethyl acetate, whereby it crystallized. The crystalline product was recrystallized from a mixture of ethanol and ether, yielding α-tert.butylamino-2-methoxy-3,4-dihydroxy-acetophenone hydrochloride, M.P. 189–190° C.

15 gm. of the amino-acetophenone salt thus obtained were dissolved in 150 cc. of methanol, and the solution was hydrogenated at standard temperature and pressure in the presence of platinum as a catalyst until substantially the theoretical amount of hydrogen had been absorbed. Thereafter, the catalyst was removed by vacuum filtration, the filtrate was evaporated, and the residue was recrystallized from acetone, yielding 1-(2'-methoxy-3',4' - dihydroxy-phenyl)-2-tert. butylamino-ethanol-(1) hydrochloride with ½ mol of water of crystallization, M.P. 97–99° C.

EXAMPLE 3

Preparation of 1-(2'-methoxy-3',4'-dihydroxyphenyl)-2-(1,1-dimethylpropylamino)-ethanol-(1)

Using a procedure analogous to that described in Example 1, α-bromo-2-methoxy-3,4-diphenylmethylenedioxy-acetophenone was reacted with 1,1-dimethyl-propylamine to form α-(1,1-dimethylpropylamino)-2-methoxy-3,4-diphenylmethylenedioxyacetophenone (M.P. of the hydrochloride 174–176° C.). The diphenylmethylene group was split off by hydrolysis and the α-(1,1-dimethylpropylamino)-2-methoxy-3,4-dihydroxyacetophenone hydrochloride (M.P. 175–176° C.) was hydrogenated in the presence of a platinum catalyst, yielding 1-(2'-methoxy-3',4'-dihydroxyphenyl)-2-(1,1 - dimethylpropylamino)-ethanol-(1), M.P. of the benzoate 172–174° C., of the formula

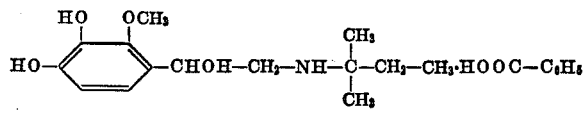

EXAMPLE 4

Using a procedure analogous to that described in Example 1, 1-(2'-methoxy-3',4'-dihydroxyphenyl-2-[β-(4- hydroxyphenyl)-ethylamino]-ethanol-(1) benzoate, M.P. 90° C. of the formula

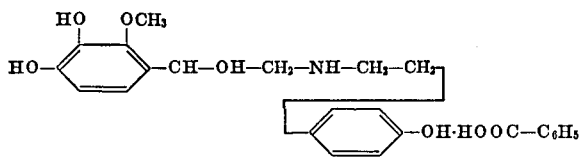

was prepared from α-[β-(4-hydroxyphenyl)-ethylamino]-2-methoxy - 3,4 - dihydroxy-acetophenone hydrochloride (M.P. 237–238° C.), which in its turn was obtained from α-[β-(4 - hydroxyphenyl)-ethylamino]-2-methoxy-3,4-diphenylmethylenedioxy-acetophenone hydrochloride, M.P. 230–231° C.

EXAMPLE 5

Using a procedure analogous to that described in Example 1, 1-(2'-methoxy-3',4'-dihydroxyphenyl)-2-[β-(2-methyl-4-hydroxyphenyl)-ethylamino]-ethanol-(1) benzoate, M.P. 153–155° C., of the formula

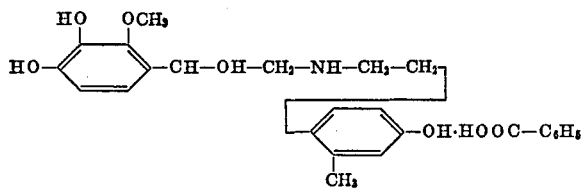

was prepared from α-[β-(2-methyl-4-hydroxyphenyl)-ethylamino]-2-methoxy-3,4-dihydroxyacetophenone benzoate (M.P. 200–203° C.) which in its turn was obtained from α-[β - (2 - methyl - 4 - hydroxyphenyl)ethylamino]-2-methoxy - 3,4 - diphenylmethylenedioxy-acetophenone hydrochloride (M.P. 153–155° C.).

EXAMPLE 6

Using a procedure analogous to that described in Example 1, 1-(2'-methoxy-3',4'-dihydroxyphenyl)-2-[β-(4-hydroxyphenyl)-α,α-dimethylethylamino]-ethanol-(1), M.P. 122° C., of the formula

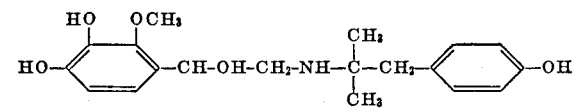

was prepared from α-[β-(4-hydroxyphenyl)-α,α-dimethylethylamino]-2-methoxy-3,4-dihydroxyacetophenone hydrochloride (M.P. 251° C.), which in its turn was obtained from α-[β-(4-acetoxyphenyl)-α,α-dimethylamino]-2-methoxy-3,4-diphenylmethylenedioxy-acetophenone oxalate (M.P. 189° C.) by hydrolysis.

EXAMPLE 7

Using a procedure analogous to that described in Example 1, 1-(2'-ethoxy - 3'4' - dihydroxyphenyl)-2-(tert.-butylamino)-ethanol-(1) hydrochloride, M.P. 159–160° C., of the formula

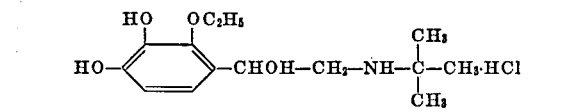

was prepared from α-(tert.-butylamino)-2-ethoxy-3,4-dihydroxyacetophenone hydrochloride (M.P. 199–203° C.), which in its turn was obtained from α-(tert.-butylamino) - 2 - ethoxy - 3,4 - diphenylmethylenedioxy-acetophenone hydrochloride (M.P. 168–172° C.).

EXAMPLE 8

Using a procedure analogous to that described in Example 1, 1-(2'-ethoxy-3,4'-dihydroxyphenyl)-2-cyclopentylaminoethanol-(1) hydrochloride, M.P. 173–174° C., of the formula

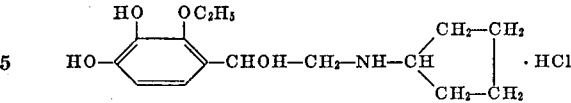

was prepared from α-cyclopentylamino-2-ethoxy-3,4-dihydroxy-acetophenone hydrochloride (M.P. 200–202° C.), which in its turn was obtained from α-cyclopentylamino-2-ethoxy-3,4 - diphenylmethylene - dioxy - acetophenone hydrochloride (M.P. 195–197° C.).

EXAMPLE 9

Using a procedure analogous to that described in Example 1, 1 - (2' - ethoxy-3',4'-dihydroxyphenyl)-2-[β-(2-methyl-4-hydroxyphenyl)-ethylamino]-ethanol - (1) benzoate, M.P. 172–174° C., of the formula

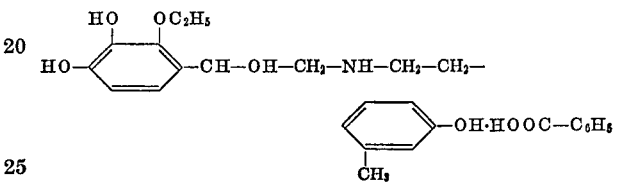

was prepared from α-[β-(2-methyl-4-hydroxyphenyl)-ethylamino]-2-ethoxy-3,4-dihydroxy - acetophenone benzoate (M.P. 166–168° C.), which in its turn was obtained from α[β - (2 - methyl-4-hydroxyphenyl)-ethylamino]-2-ethoxy-3,4-diphenylmethylenedioxy-acetophenone hydrochloride (M.P. 148–150° C.).

EXAMPLE 10

Using a procedure analogous to that described in Example 1, 1-(2'-methoxy-3',4'-dihydroxyphenyl)-2-[β-(2-methyl - 4 - hydroxyphenyl) - ethylamino] - butanol - (1) benzoate, M.P. 158–160° C., of the formula

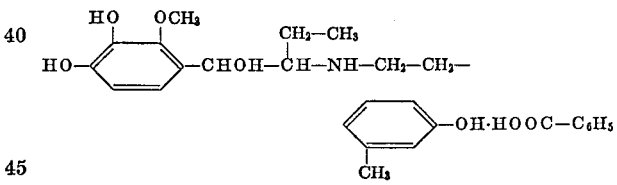

was prepared from α-ethyl-α-[β-(2-methyl-4-hydroxyphenyl) - ethylamino] - 2 - methoxy-3,4-dihydroxy-acetophenone benzoate, which in its turn was obtained from α-ethyl-α-[β-(2-methyl-4 - hydroxyphenyl) - ethylamino]-2-methoxy-3,4 - diphenylmethylenedioxy - acetophenone benzoate.

The compounds according to the present invention, that is, racemic mixtures of those embraced by Formula I, their pure stereoisomers, diastereomeric antipode pairs thereof, and non-toxic, pharmacologically acceptable acid addition salts of any of these, have useful pharmacodynamic properties. More particularly, they exhibit sympathomimetic activities in warm-blooded animals, such as mice and rats; especially, they exhibit bronchospasmolytic and antipuritic activities and dilate the peripheral blood vessels in warm-blooded animals, such as those above referred to.

Particularly active in this respect are those compounds of the Formula I wherein $R_1$ is methoxy, $R_2$ is hydrogen, methyl or ethyl, and $R_4$ is alkyl of 4 up to 8 carbon atoms, cycloalkyl of 5 carbon atoms or a substituent of the Formula Ia where Z is alkylene of 2 to 4 carbon atoms.

For pharmaceutical purposes the compounds of the present invention are administered to warm-blooded animals topically, perorally or parenterally as active ingredients in customary dosage unit compositions, that is compositions in dosage unit form consisting essentially of an inert pharmaceutical carrier and one effective dosage unit of the active ingredient, such as sprays, tablets, coated pills, granulates, suppositories, ointments, solutions or suspensions. One effective dosage unit of a compound according to the present invention is from 0.01 to 10.0 mgm./kg. body weight.

EXAMPLE 11

Tablets

The tablets are compounded from the following ingredients:

| | Parts |
|---|---|
| 1-(2'-methoxy-3',4'-dihydroxy-phenyl)-1-hydroxy-2-t-butylamino-ethane hydrochloride | 5.0 |
| Lactose, powdered | 35.4 |
| Corn starch, dry | 33.0 |
| Finely divided $SiO_2$ | 5.6 |
| Polyvinyl pyrrolidone | 0.6 |
| Magnesium stearate | 0.4 |
| Total | 80.0 |

Compounding procedure

The 1-(2'-methoxy-3',4'-dihydroxy-phenyl)-1-hydroxy-2-tert.-butylamino-ethane hydrochloride is thoroughly admixed with the lactose, 25.0 parts of the corn starch and 4.0 parts of the $SiO_2$, and the resulting mixture is uniformly moistened with a 5% ethanolic solution of the polyvinyl pyrrolidone. The moist mass is then passed through a 1 mm. mesh screen. The resulting granulate is dried for about 24 hours at 60° C. in a drying chamber with fresh air circulation. The dry granulate is again passed through a 1 mm. mesh screen. 70.0 parts of this granulate are admixed in a suitable mixer with a mixture consisting of the remainder of the $SiO_2$, the remainder of the corn starch and all of the magnesium stearate, this mixture having previously been passed through a 1 mm. mesh screen. The resulting mixture is then pressed into tablets weighing 80 mgm. each and containing 5.0 mgm. of the active ingredient. These tablets break up in the stomach within fifty seconds.

EXAMPLE 12

2% inhalation solution

This solution is packaged in 10 ml. bottles, the contents of each bottle being composed of the following ingredients:

| | Mgm. |
|---|---|
| 1-(2'-methoxy-3',4'-dihydroxy-phenyl)-1-hydroxy-2-{[α,α-dimethyl-β-(p-hydroxyphenyl)-ethyl]-amino}-ethane hydrochloride | 200.0 |
| Sodium pyrosulfite | 1.0 |
| Disodium salt of ethylene-diamine-tetraacetic acid | 5.0 |
| 1/10 N HCl, q.s. ad pH 3. | |
| Minerals-free water, q.s. ad 10.0 ml. | |

These ingredients form a clear, colorless solution with a pH of 3, which may be dispensed with the aid of an aerosol inhalation vaporizer, having an aerosol output capacity of 12.5 liters per minute for bronchospasmolytic therapy.

EXAMPLE 13

Ampules with hypodermic solution

Each ampule contains the following ingredients:

| | | |
|---|---|---|
| 1-(2'-methoxy-3',4'-dihydroxy-phenyl)-2-(tert.-butylamino)-ethanol-(1) hydrochloride | mgm | 0.5 |
| Sodium pyrosulfite | mgm | 0.1 |
| Disodium salt of ethylene-diamine-tetraacetic acid | mgm | 0.5 |
| Sodium chloride | mgm | 8.0 |
| 1/10 N HCl, q.s. ad Ph 3. | | |
| Distilled water | ml | 1.0 |

EXAMPLE 14

Suppositories

The suppositories are compounded from the following ingredients:

| | Parts |
|---|---|
| 1-(2'-methoxy-3',4'-dihydroxy-phenyl)-2-[β-(p-hydroxyphenyl)-ethyl-amino]-ethanol-(1) hydrochloride | 5.0 |
| Lactose, powdered | 45.0 |
| Suppository base (cocoa butter) | 1650.0 |
| Total | 1700.0 |

Compounding procedure

The 1-(2'-methoxy-3',4'-dihydroxy-phenyl)-2-[β-(p-hydroxy-phenyl)amino]-ethanol-(1) hydrochloride is thoroughly blended with the powdered lactose and the resulting mixture is homogeneously distributed in the molten cocoa butter. The composition is then poured into suppository molds holding 1.7 gm. of the composition. Each suppository contains 5 mgm. of the active ingredient.

EXAMPLE 15

Starch capsules for peroral administration

The contents of the capsules are compounded from the following ingredients:

| | Parts |
|---|---|
| 1-(2'-methoxy-3',4'-dihydroxy-phenyl)-2-(cyclopropylamino)-ethanol-(1) hydrochloride | 5.0 |
| Lactose | 495.0 |
| Corn starch | 500.0 |
| Total | 1000.0 |

Compounding procedure

The 1-(2'-methoxy-3',4'-dihydroxy-phenyl)-2-(cyclopropylamino)-ethanol-(1) hydrochloride is gradually admixed with the lactose. When all of the lactose has been incorporated, the mixture is blended with the corn starch. The resulting mixture is filled into capsules holding 1 gm. of the mixture. Each capsule contains 5.0 mgm. of the active ingredient.

While the present invention has been illustrated with the aid of certain specific embodiments thereof, it will be readily apparent to others skilled in the art that our invention is not limited to those particular embodiments, and that various changes and modifications may be made without departing from the spirit of the invention or the scope of the appended claims.

We claim:
1. A racemic mixture of compound of the formula

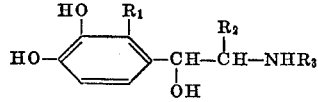

wherein
$R_1$ is straight or branched alkoxy of 1 to 5 carbon atoms,
$R_2$ is hydrogen or lower alkyl, and
$R_3$ is alkyl of 4 to 8 carbon atoms, cycloalkyl of 3 to 7 carbon atoms, or

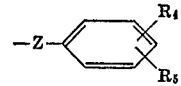

where
Z is alkylene of 2 to 6 carbon atoms,
$R_4$ is hydrogen or methyl, and
$R_5$ is hydroxyl or methoxy;
a pure stereoisomer thereof; a diastereomeric antipode pair thereof; or a non-toxic, pharmacologically acceptable acid addition salt of said racemic mixture, stereoisomer or diastereomeric antipode pair.

2. A racemic mixture of a compound of the formula

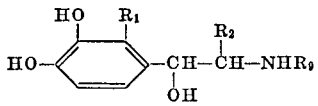

wherein
- $R_1$ is methoxy or ethoxy,
- $R_2$ is hydrogen, methyl or ethyl,
- $R_9$ is alkyl of 4 to 5 carbon atoms, cyclopentyl, or

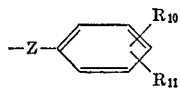

where
- Z is alkylene of 2 to 6 carbon atoms,
- $R_{10}$ hydrogen or methyl, and
- $R_{11}$ is hydroxy;

a pure stereoisomer thereof, a diastereomeric antipode pair thereof; or a non-toxic, pharamacologically acceptable acid addition salt of said racemic mixture, stereoisomer or diastereomeric antipode pair.

References Cited
FOREIGN PATENTS
230,352  12/1963  Austria _____ 260—570.6

ROBERT V. HINES, Primary Examiner

U.S. Cl. X.R.

260—340.5, 343.7, 348 A, 348 R, 348.6, 501.11 501.18, 570.5 C, 570.6; 424—330

PO-1050
(5/69)

UNITED STATES PATENT OFFICE
CERTIFICATE OF CORRECTION

Patent No. 3,804,834          Dated April 16, 1974

Inventor(s) ANTON MENTRUP, KURT SCHROMM, OTTO THOMA, KARL ZEILE

It is certified that error appears in the above-identified patent and that said Letters Patent are hereby corrected as shown below:

Col. 7 line 5 :

that portion of the formula which reads

"CH-OH-"        should read:

- - CHOH- --

Signed and sealed this 19th day of November 1974.

(SEAL)
Attest:

McCOY M. GIBSON JR.        C. MARSHALL DANN
Attesting Officer         Commissioner of Patents